United States Patent [19]
Malinowski et al.

[11] 4,206,456
[45] Jun. 3, 1980

[54] SMOKE DETECTOR

[75] Inventors: William J. Malinowski, Pembroke; William F. Doherty, Halifax, both of Mass.

[73] Assignee: Chloride Incorporated, Tampa, Fla.

[21] Appl. No.: 868,841

[22] Filed: Jan. 12, 1978

Related U.S. Application Data

[62] Division of Ser. No. 589,044, Jun. 23, 1975, abandoned.

[51] Int. Cl.[2] .......................... G08B 17/10; G01J 1/32; G01N 21/26

[52] U.S. Cl. ..................................... 340/630; 250/574; 250/205; 356/438

[58] Field of Search ............... 340/628, 630, 627, 377; 250/205, 573, 574; 356/103, 207, 208, 438, 338

[56] References Cited

U.S. PATENT DOCUMENTS

| | | | |
|---|---|---|---|
| 2,912,685 | 11/1959 | Thomas | 340/377 |
| 3,562,534 | 2/1971 | Jarrett et al. | 250/205 |
| 3,715,720 | 2/1973 | Jehle | 340/626 |
| 3,789,383 | 1/1974 | Vasel | 340/630 |

*Primary Examiner*—John W. Caldwell, Sr.
*Assistant Examiner*—Daniel Myer
*Attorney, Agent, or Firm*—Robert E. Ross

[57] ABSTRACT

A photo-electric smoke detector operating on the reflected light principle which has a rate detector for detecting the rate of increase of smoke concentration. When the rate exceeds a predetermined value, the rate detector causes the intensity of the smoke detector light source to increase, thereby increasing the sensitivity of the detector. In one embodiment of the invention, after the intensity of the light has been increased by the rate detector, it is maintained at the higher intensity for a predetermined time, even if the rate of increase of smoke concentration falls below the predetermined value.

53 Claims, 1 Drawing Figure

TIMER
RATE DETECTING CIRCUIT
SCR
P+
P-
C1
C2
C3
A1
A2
A3
R1
R2
J1
J2
D1
T1
T
A
R
10
12
14
16
18
20
22
24
26

SMOKE DETECTOR

BACKGROUND OF THE INVENTION

This application is a division of our application Ser. No. 589,044 filed June 23, 1975, now abandoned.

Smoke detectors that utilize various electronic means to provide an alarm signal when ambient smoke concentration reaches a predetermined level are widely used.

One disadvantage of such detectors is the fact that although it might be desirable for them to provide an alarm at a smoke concentration as low as 0.2% as a practical matter in the manufacture of commercial detectors it is necessary that they be calibrated so that a smoke concentration of at least 2% is required before the alarm will be actuated, to avoid false alarms from ambient smoke from non-fire sources such as tobacco smoke, severe dust conditions, cooking smoke, etc. Hence a smoldering fire in a situation where there is some air circulation so that the smoke concentration never reaches 2% may never be detected by the device.

Another disadvantage of such detectors that utilize a photo-resistive device as the detecting element is the fact that the response time of the photo-resistive device, when suddenly exposed to light reflected from smoke particles, is a function of the intensity of the light falling thereon, since the response of such devices is analagous to the charging time of a capacitor, which is a function of the applied voltage.

At a low smoke concentration, which provides a low reflected light intensity, an unduly long time will be required for the cell to reach a predetermined response level required to actuate the alarm. Also, a high smoke concentration that appears suddenly, such as may result when smoldering combustible material bursts into flame, may pass the detector so suddenly that the smoke concentration drops so rapidly that the reflected light level drops below the intensity required for alarm before the photo-responsive device has reached the alarm condition.

This situation is particularly troublesome in detectors in which light emitting diodes are used as the light source, since the light output of such devices, when operated at a current level low enough to insure a long service life, is much lower, perhaps by a factor of 20, than the light output of an incandescent bulb. In a detector with an LED light source and a photo-resistive cell calibrated to provide an alarm at a continuous smoke level of 2% (defined as the amount of smoke necessary to reduce the light intensity 2% in a column 1 foot long), a smoke concentration of just over 2% may require 10 minutes or more for the resistance of the photo-resistive cell to drop to the alarm point.

SUMMARY OF THE INVENTION

A photo-electric smoke detector operating on the reflected light principle in which means is provided for detecting the rate of change of smoke concentration, and for producing an output signal when the rate of change exceeds a predetermined value. The output is utilized to cause an increase in the intensity of the smoke detector light source.

DESCRIPTION OF THE ILLUSTRATED EMBODIMENTS

Figures 1, 2, 3:
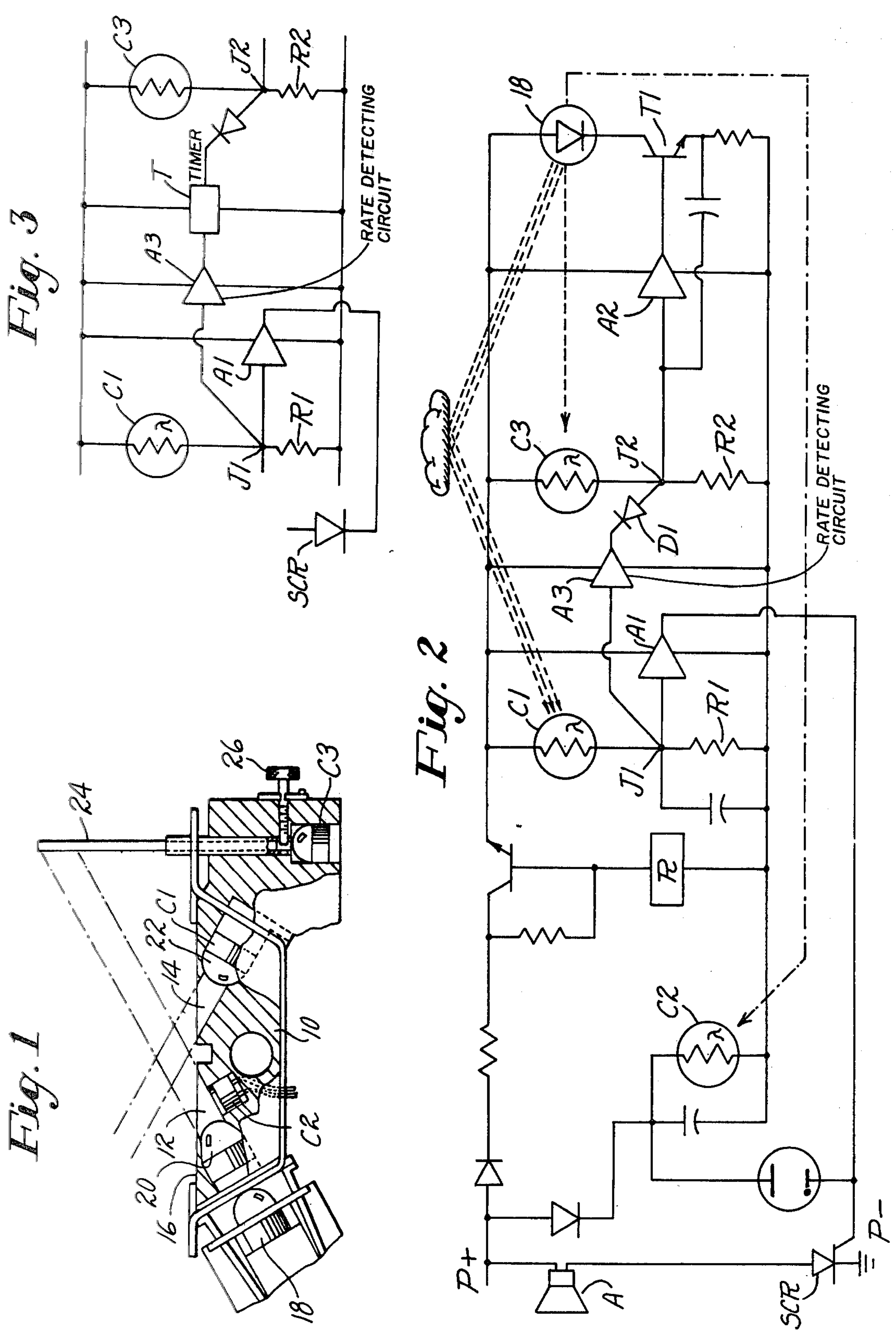
FIG. 1 is a view in side elevation, partly in section of a portion of a smoke detector assembly of a type for which the invention is designed for use.
FIG. 2 is a schematic representation of an electronic circuit embodying the features of the invention, in which a rate responsive circuit is connected so as to increase the output of the light source when the rate of change of resistance of the photo-cell exceeds a predetermined value.
FIG. 3 is a modified form of the circuit of FIG. 4, in which timing means is actuated by the rate circuit to maintain the increased light output for a predetermined period of time.

Referring to the drawing, there is illustrated in FIG. 1 a schematic representation of a smoke detector of the type utilizing a photo-resistive device to respond to light reflected from smoke particles in a light beam.

The detector includes a support block 10 which may be provided with a pair of apertures 12 and 14 which extend from the ends of the block and open to the forward face 16 thereof in spaced relation.

A light source 18 is disposed rearwardly to aperture 12 to cooperate with lens 20 in the aperture to project a beam of light from the forward end of the aperture. A photo-resistive cell C1 and suitable focusing lens 22 are disposed in aperture 14. The apertures 12 and 14 may be disposed at an angle of about 135° to take advantage of the "forward scatter" effect.

A second photo-resistive cell C3 is mounted in a recess in the support block 10, and a light pipe, such as an acrylic rod 24, extends from the cell upwardly into the light beam to conduct light therefrom onto the surface of the photo-cell. An adjusting screw 26 is provided to vary the amount of light received by the cell C3.

Referring now to FIG. 2, there is illustrated an electronic circuit for use with the smoke detector components of FIG. 1.

The circuit of FIG. 2 and the assembly of FIG. 1 are similar to that disclosed and claimed in U.S. Pat. No. 4,011,458 of William J. Malinowski, one of the coinventors of this application, and comprises a smoke detector cell C1 connected in series with a resistor R1 across a suitable power source P. The junction J1 between the cell C1 and the resistor R1 develops a voltage which is a function of the resistance of the cell C1, which voltage is applied to the input of a differential amplifier A1. The output of A1 is applied to the trigger electrode of an SCR.

A light intensity regulating cell C3 is also connected across the power source in a series with resistor R2 through a junction J2, which is connected to the input of a differential amplifier A2. The output of A2 is connected to the base of transistor T1, the emitter-collector path of which is in series with the light source 18 across the power source P.

The smoke detecting portion circuit of FIG. 2 operates in the following manner. When smoke appears in the beam from light source 18, light is reflected from the smoke onto cell C1, which is normally dark, and causes the cell to drop in resistance, raising the voltage at junction J1, which voltage is amplified by differential amplifier A1. When the resistance of cell C1 drops to a predetermined value, the output of A1 is sufficient to fire the SCR and energize the alarm.

The operation of the light regulating portion of the circuit of FIG. 2 is fully described in the above-identified patent and may be summarized as follows. An increase in light output of 18 (such as might be caused by line voltage variations), will reduce the resistance of C3, increasing the voltage at J1 and at the amplifier input, (which is an inverting amplifier) which reduces the bias on the transistor T1 to reduce the current through the light 18 and thereby reduce in light output.

However, the above-described portion of the circuit is normally calibrated to actuate the alarm only if the smoke level reaches a predetermined level, for example, 2%.

To enable the detector to respond to lower smoke concentrations without increasing the possibility of false alarms, and to increase the speed of response of the detector, a rate detecting circuit A3 is provided, the input thereof being connected to J1 and its output being connected to J2 through a diode D1.

The rate circuit is designed to provide an output voltage to junction J2 when the rate of increase of voltage at junction J1 exceeds a predetermined value. Circuits that detect and respond to the rate of change of a voltage are well known in the art. In the illustrated embodiment the circuit A3 comprises an electronic differentiator and an inverter, so that the output voltage of A3 is inversely proportional to the rate of increase, or differential of the input voltage from J1. If the rate of increase of voltage at junction J1 is below a predetermined value, the output of the electronic differentiator is unchanged. In a typical embodiment of the invention the electrical parameters of A3 are such that a smoke concentration increasing at a rate of less than 0.05% per minute is ignored, but smoke concentration increasingg at a faster rate will provide a voltage ramp at J1 having a slope or differential great enough that the output of A2, which is inversely proportional to the slope or differential of the input voltage, drops enough to affect the voltage at J2, as will now be described.

As described in the above-identified patent, amplifier A2 maintains the voltage at J2 at ½ of the supply voltage. In a typical case the supply voltage is 5 volts, so that the voltage at J2 is 2.5 volts. The electronic differentiator is also designed to have an output of ½ of the supply voltage when the input is negligible. When the voltage at J1 increases as a result of light reflected from smoke particles onto cell C1, the output voltage of A3 drops in proportion to the rate of increase of the J1 voltage. If the rate of voltage increase at J1 is great enough, the output voltage of A3 drops to a value such that current flows from J2 through the diode D1 and A3 to ground. This additional circuit path drops the voltage at J2 which increases the bias on transistor T1, increasing the output of light 18. The increased light output reflected from the smoke onto cell C1 causes a further drop in voltage at J1, so that with sufficient initial rate of increase of voltage at J1, the output voltage of A3 drops substantially to ground.

If the detector is calibrated to provide an alarm through amplifier A1 when the voltage at junction J1 corresponds to a smoke concentration of 2% (which, in the illustrated embodiment is one half of supply voltage), the increase in output of the light source to the maximum as a result of the response of the rate circuit as above described, converts the detector from a 2% detector to a detector of much greater sensitivity. In a particular embodiment of the invention the light output may be increased by the rate circuit so that the detector will become, at maximum light output, a 0.2% detector.

The rate circuit operates so rapidly in response to a voltage increase at J1 due to smoke entering the detector that seldom, if ever, does the detector contain sufficient smoke to go into alarm when the light output is increased; however, assuming that the amount of smoke in the housing continues to increase at a rate fast enough to maintain the rate circuit in operation, the alarm will be actuated by amplifier A1 when the voltage at J1 reaches ½ of the supply voltage which voltage is provided by 0.2% smoke.

However, in the event that rate of increase of smoke concentration, after the initial plume, is not sufficient to maintain the rate circuit in operation although smoke remains in the ambient atmosphere, but at a level of less than 2%, the detector may not go into alarm since the light output reduces to its original intensity as the rate of increase of voltage at J1 decreases.

To insure that the alarm will be actuated in such circumstances, there is illustrated in FIG. 3 a schematic diagram of a modified form of the circuit of FIG. 2, in which a timing device T is inserted between the output of amplifier A3 and the diode D1.

The device T, which may be a one shot mono-stable multi-vibrator is converted to a conductive state by a drop in output of electronic differentiator A3 to a predetermined level and remains in the conducting state for a predetermined period of time after the output from A3 has risen to its standby value, so that the light will remain at the higher output for a short period of time, after the rate of increase of smoke concentration has dropped, so that the detector will remain at the higher sensitivity long enough for the smoke concentration to reach 0.2% and for the cell to respond thereto.

The above-described embodiment of the invention has the advantage of providing a smoke detector which normally operates at a standard sensitivity of 2% smoke, yet converts to a high sensitivity condition when a predetermined rate of increase of smoke concentration is detected. The detector is thereby substantially immune to false alarms from relatively high levels of ambient smoke from non-fire sources yet is almost instantly converted to the sensitive mode of operation by a sudden increase in smoke concentration at a rate which is unlikely to result from any source other than an incipient fire.

Since certain changes obvious to one skilled in the art may be made in the herein described embodiments of the invention without departing from the scope thereof, it is intended that all matter contained herein be interpreted in an illustrative and not a limiting sense.

We claim:

1. A particle detector, comprising a light source, photo-responsive means positioned to receive light reflected from smoke particles illuminated by said source, means responsive to a change in electrical characteristics of said photo-responsive device caused by said reflected light to provide an alarm signal, at a predetermined smoke concentration and means responsive to a rate of increase of smoke concentration illuminated by the light source above a predetermined rate to increase the light output of said light source, whereby the alarm is caused at a lesser smoke concentration.

2. A particle detector as set out in claim 1 in which means is provided for maintaining the light source in the increased output condition for a predetermined limited time regardless of the subsequent rate of change of smoke concentration.

3. In a smoke detector comprising a light source, a first photo-responsive device positioned to receive light reflected from smoke particles illuminated by the smoke, said first photo-responsive device being connected in series with a resistor through a first junction across a power source whereby the voltage at the first junction is a function of the amount of smoke viewed by the photo-responsive device, and means responsive to a predetermined voltage at the first junction to actuate an alarm, a second photo-responsive device connected in series with a resistor through a second junction across the power source, said second photo-responsive device being continuously exposed to light from the light source, means responsive to the voltage at the second junction to regulate the intensity of the light source, the improvement comprising means responsive to a rate of change of voltage at the first junction above a predetermined rate to shift the voltage at said second junction in a direction so as to increase the intensity of the light source, whereby the sensitivity of the detector is increased because of the resulting change in voltage at the first junction toward the predetermined voltage that actuates the alarm.

4. A particle detector, comprising detector means normally in a first condition for providing an alarm at a first particle concentration, circuit means responsive to a rate of increase of particle concentration above a predetermined rate to convert said detector to a second condition in which it is responsive to a substantially lesser particle concentration to provide an alarm, and circuit means for thereafter maintaining said detector in said second condition for a predetermined limited period of time regardless of the rate of change of particle concentration.

5. A particle detector, comprising a light source, photo-responsive means positioned to receive light reflected from smoke particles illuminated by said source, electric circuit means responsive to a change in electrical characteristics of said photo-responsive device caused by the presence of a predetermined concentration of particles to actuate an alarm signal, and means responsive to a rate of change of said electrical characteristics above a predetermined rate to change a parameter of said electric circuit to cause said alarm to be actuated at a particle concentration appreciably less than said predetermined concentration and means for thereafter maintaining said circuit parameter in the changed condition for a predetermined limited time regardless of the subsequent rate of change of said electrical characteristics.

* * * * *